US012764603B2

(12) United States Patent
Uniyal

(10) Patent No.: US 12,764,603 B2
(45) Date of Patent: Oct. 13, 2026

(54) GENERIC ENHANCED CAPACITY DIMENSIONING OF CELL SITES IN A 5G STANDALONE O-RAN NETWORK

(71) Applicant: DISH Wireless L.L.C., Englewood, CO (US)

(72) Inventor: Manish Uniyal, Parker, CO (US)

(73) Assignee: DISH Wireless L.L.C., Englewood, CO (US)

( * ) Notice: Subject to any disclaimer, the term of this patent is extended or adjusted under 35 U.S.C. 154(b) by 263 days.

(21) Appl. No.: 18/612,309

(22) Filed: Mar. 21, 2024

(65) Prior Publication Data

US 2025/0301370 A1 Sep. 25, 2025

(51) Int. Cl.
*H04W 28/08* (2023.01)
*H04W 24/10* (2009.01)
*H04W 28/02* (2009.01)
*H04W 72/543* (2023.01)

(52) U.S. Cl.
CPC ....... *H04W 28/0942* (2020.05); *H04W 24/10* (2013.01); *H04W 28/0278* (2013.01); *H04W 72/543* (2023.01)

(58) Field of Classification Search
CPC ..... H04W 16/00; H04W 16/18; H04W 16/24; H04W 16/32
See application file for complete search history.

(56) References Cited

U.S. PATENT DOCUMENTS 8,265,634 B1 * 9/2012 Bales .................... H04W 16/22 455/445
2003/0186693 A1 * 10/2003 Shafran ................. H04W 16/18 455/446
2006/0240834 A1 * 10/2006 Sawaya ................. H04W 16/18 455/446
2023/0345257 A1 * 10/2023 Bourgeois ............. H04W 24/08

OTHER PUBLICATIONS

Wikipedia, The Free Encyclopedia, "Shannon-Hartley theroem", https://en.wikipedia.org/wiki/Shannon-Hartley_theorem, 8 pages, [Accessed Dec. 8, 2023].
MPIRICAL Innovating Telecoms Training, to 5G Radio Planning, 2 pages, May 20, 2020.
Commscope, White Paper_A planning guide to optimizing networks for capacity with practical field examples, Commscope.com (2018) WP-112071.2-EN (10/18), 23 pages.

* cited by examiner

*Primary Examiner* — Kevin C. Harper
(74) *Attorney, Agent, or Firm* — Quarles & Brady, LLP

(57) ABSTRACT

A method for capacity dimensioning of cell sites for a target service area having a set of sub-areas where each sub-area is associated with a service area type is provided. For each sub-area, the method includes determining a total traffic estimation based on a first set of inputs that includes a subscriber amount and forecast, subscriber class(es), a traffic mix end model, and a simulated busy hour data volume, determining a total coverage estimation based on a second set of inputs that includes an area size probability, a site area, a propagation model, and a maximum allowable path loss,
(Continued)

determining a number of capacity sites based on the total traffic estimation and a site capacity, determining a number of coverage sites based on the total coverage estimation, and determining a number of cell sites for the sub-area based on the number of capacity sites and the number of coverage sites.

20 Claims, 6 Drawing Sheets

GENERIC ENHANCED CAPACITY DIMENSIONING OF CELL SITES IN A 5G STANDALONE O-RAN NETWORK

BACKGROUND

Wireless communication networks that transport digital data and telephone calls are becoming increasingly sophisticated. Currently, fifth generation (5G) broadband cellular networks are being deployed around the world. These 5G networks use emerging technologies to support data and voice communications with millions, if not billions, of mobile phones, computers and other devices. 5G technologies are capable of supplying much greater bandwidths than was previously available.

SUMMARY

In accordance with an embodiment, a method for capacity dimensioning of cell sites for a target service area in a wireless communication network is provided where the target service area is associated with a set of sub-areas including one or more sub-areas, each sub-area associated with a service area type. The method includes, for each sub-area e in the set of sub-areas, receiving, with at least one processor device, a first set of inputs comprising a subscriber amount and forecast, one or more subscriber classes, a traffic mix end model, and a simulated busy hour data volume and a second set of inputs comprising an area size probability, a site area, a propagation model, and a maximum allowable path loss. The method further includes receiving, with the at least one processor device, a site capacity, determining, with the at least one processor device, a total traffic estimation based on the first set of inputs, determining, with the at least one processor device, a total coverage estimation based on the second set of inputs, determining, with the at least one processor device, a number of capacity sites based on the total traffic estimation and the site capacity, determining, with the at least one processor device, a number of coverage sites based on the total coverage estimation, and determining, with the at least one processor device, a number of cell sites for the sub-area in the target service area based on the number of capacity sites and the number of coverage sites. The method further includes generating, with the at least one processor device, a report comprising at least the number of cell sites for each sub-area in the target service area.

In accordance wither another embodiment, a system for capacity dimensioning of cell sites for a target service area in a wireless communication network is provided where the target service area has a set of sub-areas including one or more sub-areas. Each sub-area is associated with a service area type. The system includes a memory that stores one or more computer readable media that include instructions, and one or more processor devices that execute the instructions of the computer readable media to, for each sub-area in the set of sub-areas, receive a first set of inputs including a subscriber amount and forecast, one or more subscriber classes, a traffic mix end model, and a simulated busy hour data volume and a second set of inputs including an area size probability, a site area, a propagation model, and a maximum allowable path loss, receive a site capacity, determining a total traffic estimation based on the first set of inputs, determine a total coverage estimation based on the second set of inputs, determine a number of capacity sites based on the total traffic estimation and the site capacity, determine a number of coverage sites based on the total coverage estimation, determine a number of cell sites for the sub-area in the target service area based on the number of capacity sites and the number of coverage sites, and generate a report comprising at least the number of cell sites for each sub-area in the target service area.

In accordance with another embodiment, a non-transitory, computer-readable medium storing instructions that, when executed by an electronic processor, perform a set of functions that include, for each sub-area associated with a target service area in a wireless communication network, each sub-area having an associated service area type, receiving a first set of inputs comprising a subscriber amount and forecast, one or more subscriber classes, a traffic mix end model, and a simulated busy hour data volume and a second set of inputs comprising an area size probability, a site area, a propagation model, and a maximum allowable path loss. The set of functions further include receiving a site capacity, determining a total traffic estimation based on the first set of inputs, determining a total coverage estimation based on the second set of inputs, determining a number of capacity sites based on the total traffic estimation and the site capacity, determining a number of coverage sites based on the total coverage estimation, and determining a number of cell sites for the sub-area in the target service area based on the number of capacity sites and the number of coverage sites. The set of functions further includes generating a report comprising at least the number of cell sites for each sub-area in the target service area.

BRIEF DESCRIPTION OF THE DRAWINGS

The present disclosure will hereafter be described with reference to the accompanying drawings, wherein like reference numerals denote like elements.

DETAILED DESCRIPTION

Figure 1A:
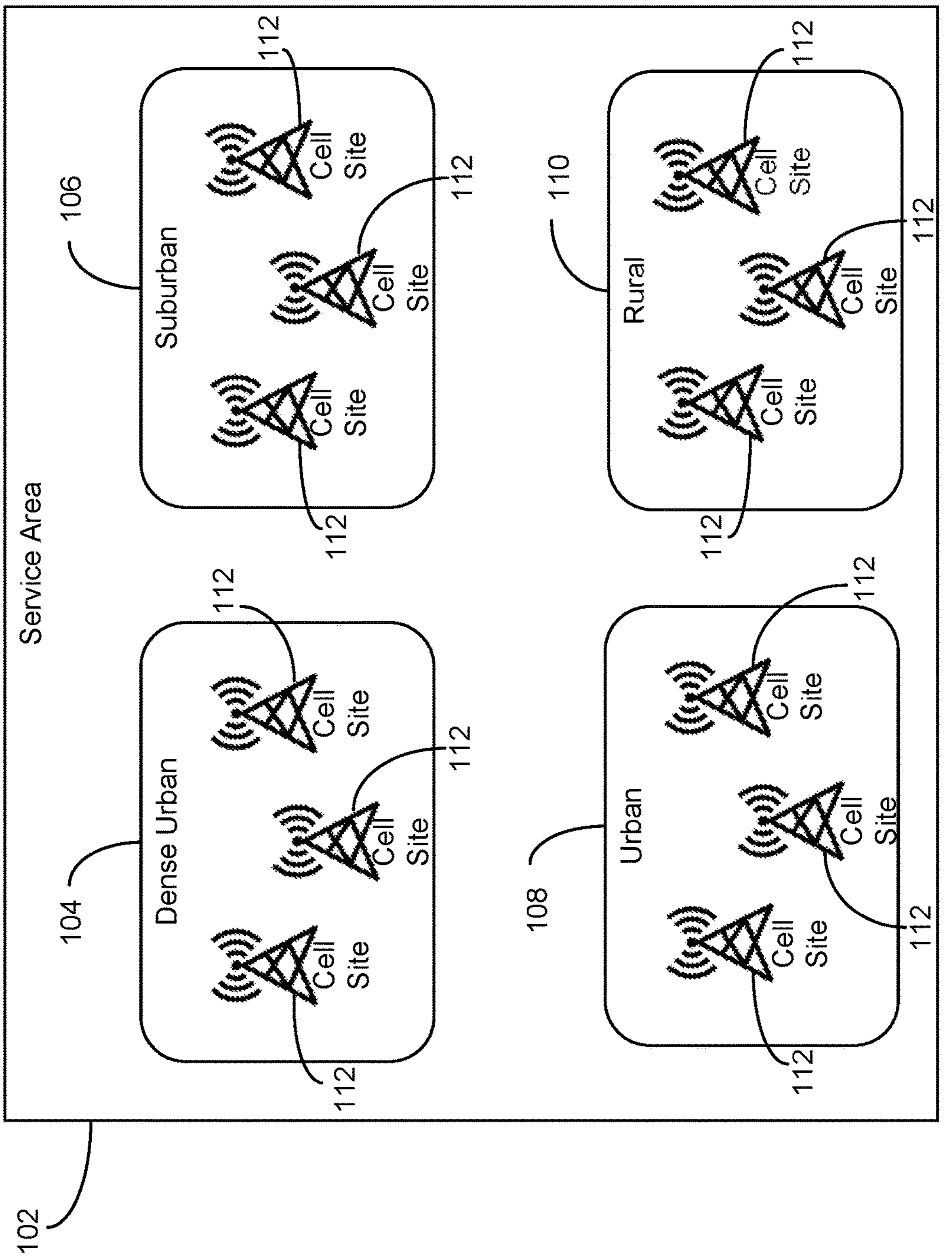
FIGS. 1A and 1B are block diagrams of example service areas for a wireless communication network that include one or more sub-areas associated with one or more service area types in accordance with an embodiment.

A plurality of hardware and software-based devices, as well as a plurality of different structural components can be used to implement the disclosed technology. In addition, examples of the disclosed technology can include hardware, software, and electronic components or modules that, for purposes of discussion, can be illustrated and described as if the majority of the components were implemented solely in hardware. However, in at least one example, the electronic based aspects of the disclosed technology can be implemented in software (for example, stored on non-transitory computer-readable medium) executable by one or more electronic processors. Although certain drawings illustrate hardware and software located within particular devices, these depictions are for illustrative purposes only. In some examples, the illustrated components can be combined or divided into separate software, firmware, hardware, or combinations thereof. As one example, instead of being located within and performed by a single electronic processor, logic and processing can be distributed among multiple electronic processors. Regardless of how they are combined or divided, hardware and software components can be located on the same computer device or can be distributed among different computing devices connected by one or more networks or other suitable communication links.

Wireless communication networks (e.g., a fifth generation (5G) New Radio (NR) cellular network) are composed of multiple cell sites that provide wireless coverage and capacity to users (or subscribers). A cell site is a physical location where electronic communication equipment (e.g., transceivers and supporting technology) and one or more antennas are mounted allowing the surrounding area to use wireless communication devices. The wireless communication devices can be user equipment (UE) such as, for example, smartphones, wireless modems, cellular phones, laptop computers, wireless access portals (APs), etc. that are configured to communicate according to the radio access technology (RAT) of the communication network (e.g., a 5G NR network). A cell site can be implemented as, for example, a cell tower, a rooftop site, a small cell, outdoor distributed antenna system (DAS), indoor DAS, a macrocell, a microcell, a picocell, and/or a femtocell, etc. A cell site in a communication network of a particular communication service provider (CSPs) can be owned or leased by the CSP.

Each cell site can provide coverage for a certain area (e.g., a number of miles) and can support a certain number of users. The number of cell sites required for a certain geographic area (e.g., a city, a portion of a city such as a downtown area, a county, a state, a country, etc.) in a communication network may be determined, for example, when a CSP has determined that the network capacity and/or coverage of the existing network is limited in the area thereby affecting service for users, when a CSP is establishing and deploying a network in a new area where the CSP has not previously had a network including infrastructure, or when the CSP is deploying a new radio access technology in an existing network.

For a communication network, channel capacity can be used to determine how and where the network may be limited. The Shannon-Hartley theorem indicates various factors that can be used to determine capacity and that, in turn, can be used to expand capacity. The Shannon-Hartley theorem states the channel capacity C, meaning the theoretical tightest upper bound on the information rate of data that can be communicated at an arbitrarily low error rate using an average received signal power S through an analog communication channel subject to additive white Gaussian noise (AWGN) of power N, as given by:

$$C = B\log_2\left(1 + \frac{S}{N}\right) \quad (1)$$

where C is the channel capacity in bits per second, a theoretical upper bound on the net bit rate (information rate, sometimes denoted I) excluding error-correction codes; B is the bandwidth of the channel in hertz (passband bandwidth in case of a band pass signal); S is the average received signal power over the bandwidth (in case of a carrier-modulated passband transmission, often denoted C), measured in watts (or volts squared); N is the average power of the noise and interference over the bandwidth, measured in watts (or volts squared); and S/N is the signal-to-noise ratio (SNR) or the carrier-to-noise ratio (CNR) of the communication signal to the noise and interference at the receiver (expressed as a linear power ratio, not as logarithmic decibels). Accordingly, capacity in an area can be affected by the number of cell sites (referred to as densification).

Capacity dimensioning may be used to identify the number of cell sites required throughout the network or a specific geographic area of the network. In an example, for an existing service area of the network, capacity dimensioning can be used to determine the number of additional cell sites required to provide the total number of cell sites needed to meet performance requirements. In another example, for a new area for the network, capacity dimensioning can be used to determine the number of cell sites required for the new area to meet performance requirements. Typically, densification can be expressed in number of cell sites per square kilometer.

Figure 1B:
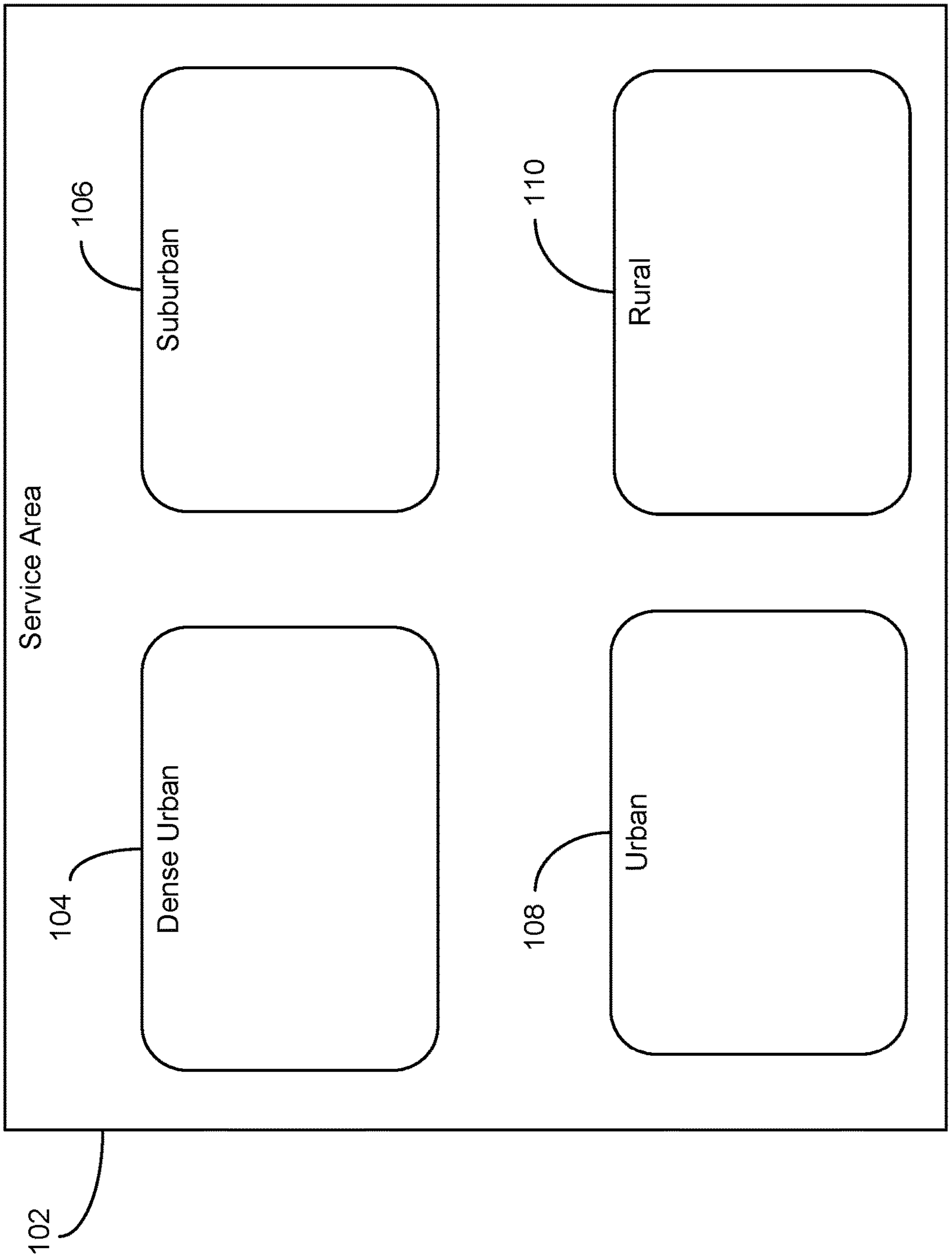

A communication network can include multiple service areas that can each correspond to a geographic area of the communication network (e.g., a city, a portion of a city such as a downtown area, a county, a state, a country, etc.). Each service area can also have one or more sub-areas that are defined based on a type of service area such as, for example, dense urban, suburban, urban, and rural. An urban service area type can refer to an area with high population (e.g., a city). A dense urban service area type can refer to a physical region of urban area with a higher number of people per unit ("dense"). A rural service area type can refer to an area that is generally open and spread out with a small population and large areas of undeveloped land. A suburban service area type can refer to an area with a lower population (and density) than an urban area and a larger population than a rural area, for example, a residential area outside of an urban area. FIGS. 1A and 1B are block diagrams of example service areas for a wireless communication network that include one or more sub-areas associated with one or more service area types in accordance with an embodiment. In FIGS. 1A and 1B a service area 102 which can represent a geographic area (e.g., a city, a state) can include one or more sub-areas 104, 106, 108, 100 where each sub-area 104, 106, 108, 110 can be associated with a type of service area including, for example, dense urban, suburban, urban, or rural. In one example, the service area 102 may be a city which can include a dense urban sub-area 104 and an urban sub-area 110. In another example, the service area 102 may be a state which can include all four sub-areas, namely, a dense urban sub-area 104, a suburban sub-area 106, an urban 108 sub-area, and a rural sub-area 110. In yet another example, the service area 102 may be a county and may include an urban sub-area 108, a suburban sub-area 106, and a rural sub-area 110. In some embodiments, the service area 102 can include more than one sub-area that is associated with the same service-area type. In some embodiments, for example, a service area may include two or more non-overlapping, continuous, and/or non-contiguous geographic sub-areas that are associated with the same service area type. In one example, a city may have four non-overlapping geographic sub-areas that include two suburban sub-areas, an urban sub-area and a dense urban sub-area.

In FIG. 1A, each sub-area 104, 106, 108, 110 of the service area 102 includes a plurality of cell sites 112. For simplicity and ease of understanding, FIG. 1A shows a case where each sub-area (associated with a service area type) 104, 106, 108, 110 each include three cell sites 112. However, each sub-area 104, 106, 108, 110 in the service area 102 can include more than three cell sites 112. Real-world implementations can include many (e.g., hundreds, thousands) of cell sites 112. The cell sites 112 may be implemented as, for example, a cell tower, a base station, a macrocell, a microcell, a picocell, and/or a femtocell. In FIG. 1A, the service area 102 may represent a portion of a wireless network built around, for example, 5G standards promulgated by standards setting organizations under the umbrella of the Third Generation Partnership Project (3GPP). Accordingly, the cell sites 112 may be configured for and be a part of a 5G network such as, for example, a 5G cellular network. Such 5G networks may comply with industry standards such as, for example, the Open Radio Access Network (Open RAN or O-RAN) standard that describes interactions between the network and user equipment (e.g., mobile phones and the like). The O-RAN model follows a virtualized model for 5G wireless architecture in which 5G base stations (gNBs) are implemented using separate centralized units (CUs), distributed units (DUs), and radio units (RUs). In some embodiments, O-RAN CUs and DUs may be implemented using software modules executed by distributed (e.g., cloud) computing hardware. In some configurations, the wireless communication network that includes cell sites 112 may be a standalone (SA) network (e.g., a 5G SA network) that utilizes 5G cells for both signaling and information transfer via a 5G packet core architecture. In other configurations, the wireless communication network that includes cell sites 112 may be a non-standalone (NSA) network that depends on another network, such as, for example, a control plane of a fourth generation (4G) long term evolution (LTE) network.

As mentioned, capacity dimensioning can be used to determine the number cell sites for an existing area (e.g., a service area) of a communication network, for example, when it is determined additional cell sites may be needed to expand capacity. For example, in FIG. 1A, if the target service area 102 is a city with a dense urban sub-area 104 and an urban sub-area 108, capacity dimensioning may be used to determine the number of cell sites for the dense urban sub-area 104 and the number of the cell sites for the urban sub-area 108. Capacity dimensioning can also be used to determine the number of cell sites for a new area for the network where the CSP does not yet have infrastructure including cell sites as illustrated in FIG. 1B. For example, if the target service area 102 is a state with sub-areas associated with all four service area types (e.g., a dense urban sub-area 104, a suburban sub-area 106, an urban sub-area 108 and a rural sub-area 110), capacity dimensioning may be used to determine the number of cell sites for each sub-area 104, 106, 108 and 110.

The present disclosure describes systems and methods for capacity dimensioning of cell sites in a communication network. Advantageously, the disclosed capacity dimensioning systems and methods can be applied to any type of service area which can provide efficiency and time savings for network planning. In addition, the disclosed capacity dimensioning systems and methods can be utilized to estimate and reduce capital expenditures (CAPEX) when deploying a new network (or area of a network) or upgrading a network (e.g., expanding an existing network or deploying a new technology in an existing network). In some embodiments, the systems and methods for capacity dimensioning of cell sites in a communication network described herein can be used as part a network planning process or system, for example, the number of sites determined by the capacity dimensioning may be utilized in a detailed planning phase which can determine the locations and parameters (or configurations) of the cell sites.

Figure 2:
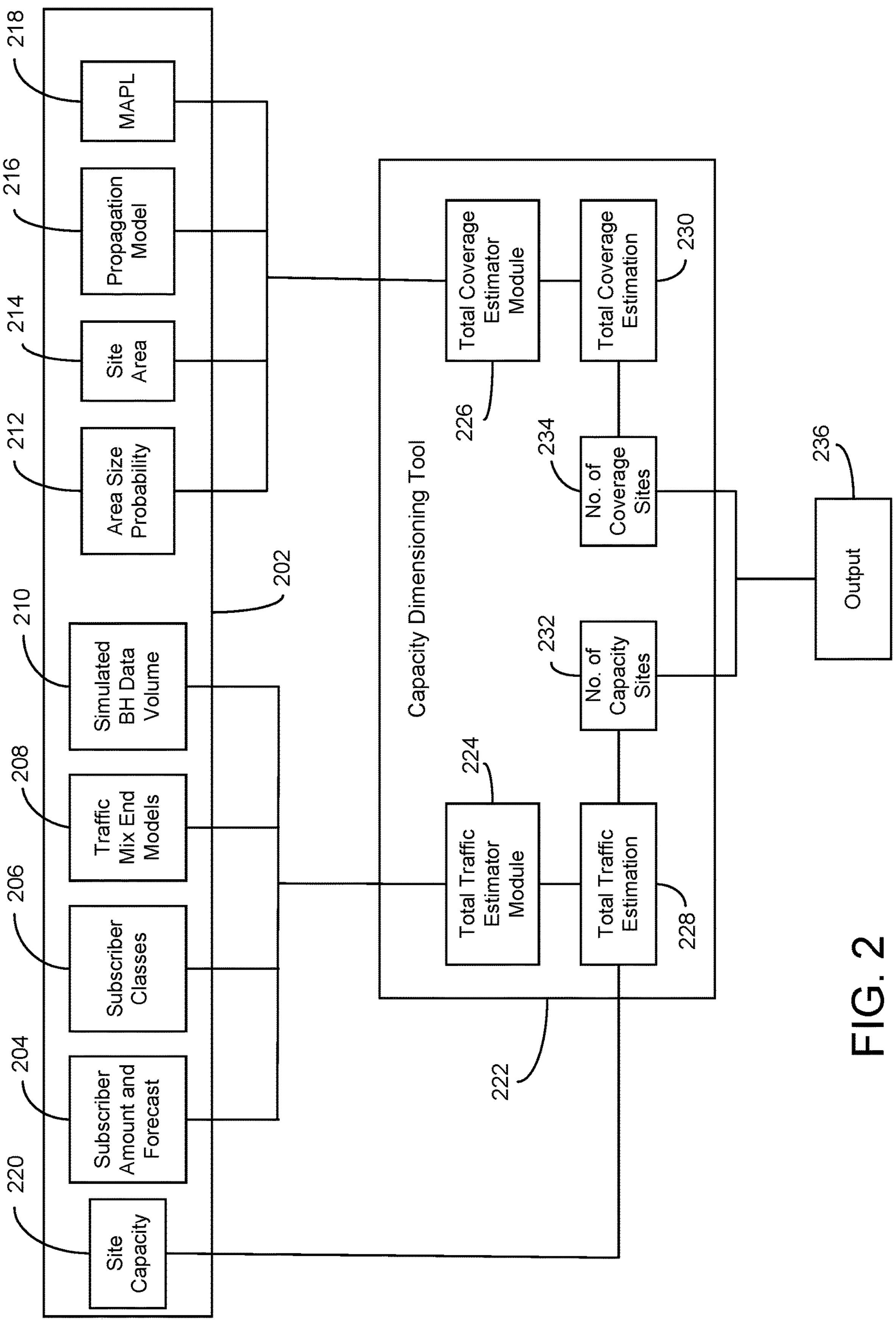
FIG. 2 is a bock diagram of a system for capacity dimensioning of cell sites for a target service area in a wireless communication network in accordance with an embodiment.

FIG. 2 is a bock diagram of a system for capacity dimensioning of cell sites for a target service area in a wireless communication network in accordance with an embodiment. As discussed above with respect to FIGS. 1A and 1B, a target service area (e.g., a downtown area in a city, a city, a state, a country) can include one or more sub-areas that are each associated with a service area type. The system for capacity dimensioning of cells sites illustrated in FIG. 2 is advantageously configured to receive inputs 202 that allow the system to be a "generic" tool, namely, the system can be applied to each sub-area and its associated service area type (e.g. geographical service area types such as dense urban, suburban, urban, rural) included in a target service area being evaluated for capacity dimensioning. As discussed further below, in some embodiments where the target service area includes two or more sub-areas (each with an associated service area type), the system can be applied to determine a number of cell sites for each sub-area and the total number of cell sites for the target service area can be determined by for example, summing the determined number of cell sites for each sub-area. The system can include inputs 202, a capacity dimensioning tool 222 including a total traffic estimator module 224 and a total coverage estimator module 226, and an output 236. In FIG. 2, the inputs 202 to the capacity dimensioning tool 222 can include a first set of inputs 203-210 that can be provided to the total traffic estimator module 224, and a second set of inputs 212-218 that can be provided to the total coverage estimator module 226 of the capacity dimensioning tool 222. In some embodiments, one or more of the inputs 202 can be provided to the system by a user, for example, using an input device such as a graphical user interface (GUI) that is configured to allow an operator to provide data or select files for input to the system. For example, the inputs 202 may be provided to or selected for the system in FIG. 2 using GUI 500 discussed below with respect to FIG. 5. In some embodiments, one or more of the inputs 202 can be retrieved from data storage (or memory) of a computer system on which the disclosed system for capacity dimensioning of cell sites is implemented or from data storage of a different computer system.

The first set of inputs can include a subscriber amount and forecast 204, subscriber classes 206, traffic mix end models 208, and simulated BH data volume 210. The subscriber amount 204 is the current number of subscribers (or users) in the communication network and the subscriber forecast 204 is an estimate of the number of subscribers expected in the network in the future. The subscriber classes 206 can include one or more types of communication, for example, data, voice, video, etc. The traffic mix end models 208 can be used to model traffic in the communication network and can include, for example, Poisson distributed packet arrivals, full buffer, FTP traffic model, bursty traffic, etc. The simulated busy hour (BH) data volume 210 can be generated using simulations of network traffic for the target service area and is a value that indicates the amount of data volume during the busy hour as determined, for example, for a 24-hour period. In some embodiments, the busy hour is the hour where there is maximum network traffic in a simulated 24-hour period (i.e., a whole day period).

The second set of inputs can include an area size probability 212, a site area 214, a propagation model 216, and a maximum allowable path loss (MAPL) 218. In addition to the first set of inputs and the second set of inputs, a site capacity 220 can also be provided to the capacity dimensioning tool 222. For the second set of inputs, the area size probability is the geographical area to be covered by the capacity dimensioning. In some embodiments, the area size probability can be an estimated area size in square kilometers, square meters, or some polygon. The site area can indicate how many estimated cell sites are planned to be covered in the area size and which can then be evaluated using the capacity dimensioning tool 222 to determine, for example, if more cell sites are required to cover the area size. The propagation model can be a model such as, for example, Monte-Carlo, Okumura-Hata model, COST231-Hata model, CCIR model, Young model, etc. that can be used to determine a cell radius and coverage for each cell site. In some embodiments, the capacity dimensioning tool 222 can be configured to apply the propagation model to a group of cell sites combined under, for example, a market or cluster. The MAPL describes the maximum amount of attenuation that a radio signal can undergo before it becomes unusable (i.e., the maximum amount of signal loss that can occur during transmission while still maintaining an acceptable level of signal quality) and can be given by:

$$MAPL = \text{Equivalent omnidirectional radiation power of transmitter } (EIRP) - \text{Minimum power of receiver } (MPR) + \text{other gain, margin of loss} \tag{2}$$

The MAPL may be determined using a link budget which is a calculation that quantitatively assesses whether a communication link will perform successfully. In some embodiments, the MAPL (and link budget) can be determined for each frequency band of the communication network. The site capacity indicates a current or desired capacity for each cell site in the target service area. One or more of the inputs 202 may be stored in data storage or memory (e.g., memory 410 shown in FIG. 4).

As mentioned, the first set of inputs can be provided to the total traffic estimator module 224 which can be configured to generate a total traffic estimation 228 based on the inputs. In some embodiments, the total traffic estimation 228 can be a value expressed in, for example, Erlang for 2G or 3G networks, or in megabits per second (mbps) for 4G or 5G (e.g., 5G O-RAN) networks. In some embodiments, the total traffic estimator module 224 can be configured to run a simulation based on the first set of inputs to determine the total traffic estimation 228. The site capacity 220 and the total traffic estimation 228 can be used to determine a number of capacity sites 232. The number of capacity sites 232 can be the number of cell sites that meets the capacity requirements for the target service area. For example, in some embodiments, the capacity requirements for the target service area may be based on the site capacity 220 for each cell site in the target service area and the total traffic estimation 228 for the target service area. The second set of inputs can be provided to the total coverage estimator module 226 which can be configured to generate a total coverage estimation 230 based on the inputs. In some embodiments, the total coverage estimation 230 can be a value expressed in units of distance such as, for example, square kilometers or square meters. In some embodiments, the total coverage estimator module 226 can be configured to run a simulation based on the second set of inputs or run an analysis of the second set of inputs to determine the total coverage estimation 230. The total coverage estimation 230 can be used to determine a number of coverage sites 234, for example, an estimated number of cell sites needed to cover the target service area. The total traffic estimation 228, number of capacity sites 232, total coverage estimation 230 and the number of coverage sites 234 may be stored in data storage or memory (e.g., memory 410 shown in FIG. 4).

The capacity dimensioning tool 222 can be configured to generate an output 236 that can include a number of cell sites for the target service area. In some embodiments, the number of cell sites for the target service area can be determined by selecting the maximum of the number of capacity sites 232 and the number of coverage sites 234 (i.e., the larger of the number of capacity sites 232 and the number of coverage sites 234 can be selected). In some embodiments, the output 236 may also include the total traffic estimation 228, number of capacity sites 232, total coverage estimation 230 and the number of coverage sites 234. In some embodiments, the output 236 may include a report that includes, for example, the number of cell sites for the target service area. In some embodiments, the report may include, for example, images, maps, text or metric based reports, audio reports, and the like. In some embodiments, the output 236 including, for example, the number of cell sites for the target service area can be stored in data storage or memory of a computer system (e.g., memory 410 shown in FIG. 4). In addition, the output 236 may be provided to and displayed on a display (e.g., display 404 of computer 400 shown in FIG. 4). In some embodiments, the determined number of cell sites can be provided to a user or to another software tool and utilized for additional processes for network planning such as, for example, determining the locations and parameters (or configurations) of the cell sites for the target service area.

Figure 4:
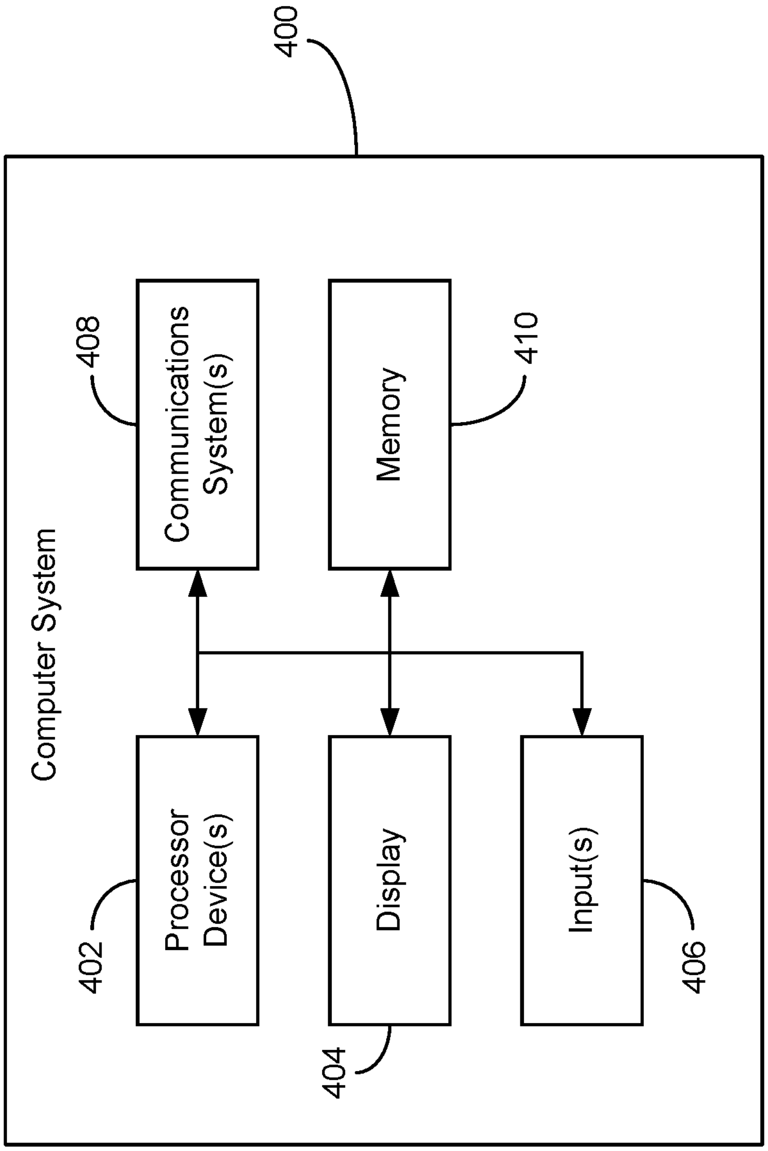
FIG. 4 is a block diagram of an example computer system in accordance with an embodiment.

In some embodiments, various components of the system for dimensioning cell sites (e.g., the capacity dimensioning tool 222, total traffic estimator module 224, and the total coverage estimator module 226) can be implemented on a computer system (e.g., computer system 400 discussed below with respect to FIG. 4). While FIG. 2 illustrates various components of the system for dimensioning cell sites, other embodiments of the system for dimensioning cell sites can vary the arrangement, communication paths, and specific components of the system. In some embodiments, the system can include fewer, additional, or different components in different configurations than illustrated in FIG. 2.

Figure 3:
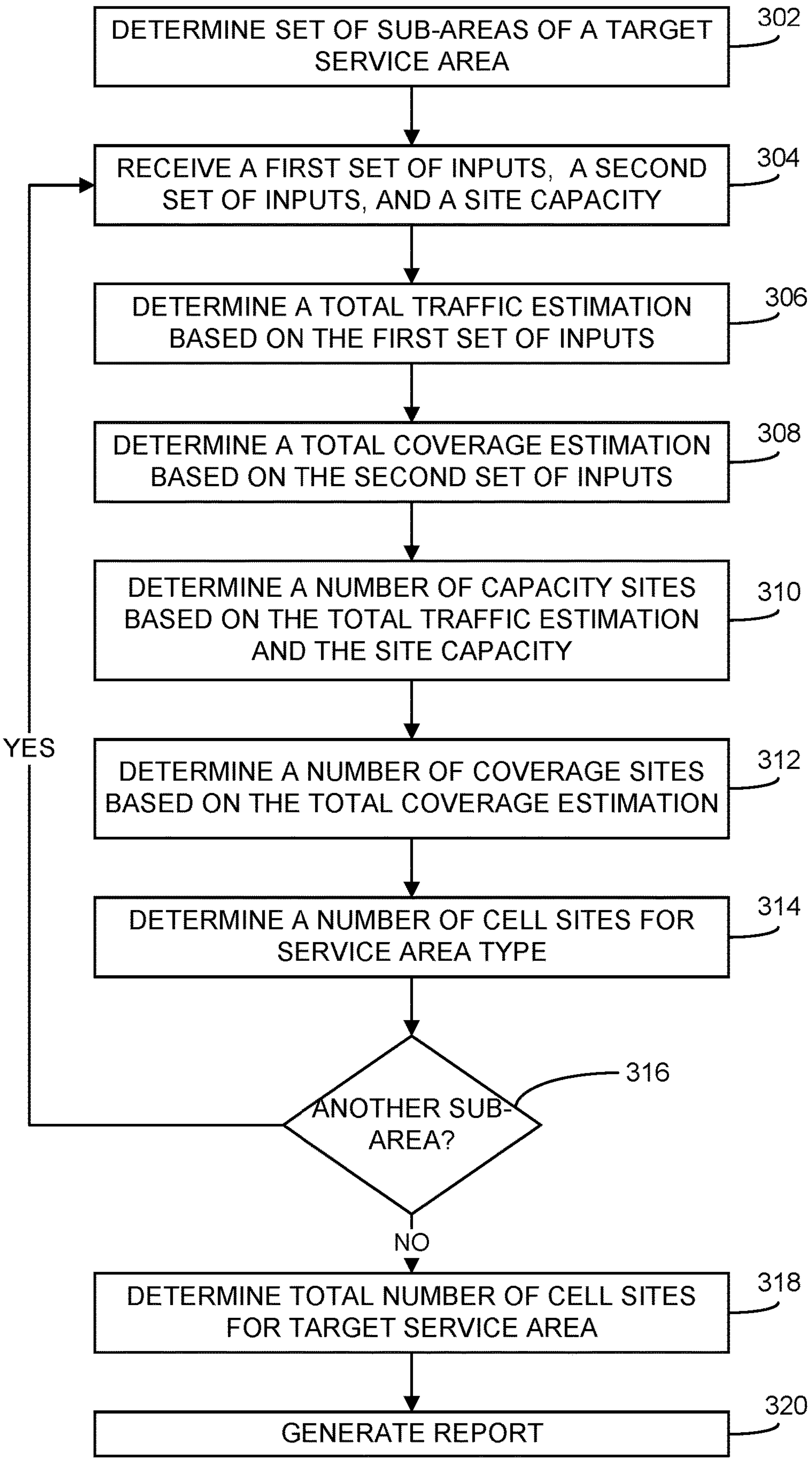
FIG. 3 illustrates a method for capacity dimensioning of cell sites for a target service area in a wireless communication network in accordance with an embodiment.

FIG. 3 illustrates a method for capacity dimensioning of cell sites for a target service area in a wireless communication network in accordance with an embodiment. The process illustrated in FIG. 3 is described as being carried out by the system illustrated in FIG. 2. However, in some examples, the process of FIG. 3 may be implemented by another system. Although the blocks of the process are illustrated in a particular order, in some embodiments, one or more blocks may be executed in a different order than illustrated in FIG. 3, or may be bypassed.

At block 302, a set of sub-areas (and the service area type for each sub-area) associated with a target service area may be determined. As discussed above, with respect to FIGS. 1A and 1B, a target service area can include one or more sub-areas with one or more service area types, for example, dense urban, suburban, urban, and rural. The process of blocks 304-314 as discussed further below can advantageously be applied to each sub-area (and its associated service area type) of the target service area. Accordingly, the same process can be used for capacity dimensioning of cell sites for each sub-area and service area type in a target service area.

At block 304, inputs 202 including a first set of inputs, a second set of inputs, and a site capacity can be received, for example, by a capacity dimensioning tool 222. The first set of inputs can include a subscriber amount and forecast 204, subscriber classes 206, traffic mix end models 208, and simulated BH data volume 210. The second set of inputs can include an area size probability 212, a site area 214, a propagation model 216, and a maximum allowable path loss (MAPL) 218. In some embodiments, one or more of the inputs 202 can be received from a user, for example, using an input device such as a graphical user interface (GUI) that is configured to allow the user to provide data or select files for input to the tool 222. In some embodiments, one or more of the inputs 202 can be retrieved from data storage (or memory) of a computer system.

At block 306, a total traffic estimation 228 can be determined (e.g., using a total traffic estimator module 224) based on the first set of inputs. At block 308, a total coverage estimation can be determined (e.g., using a total coverage estimator module 226) based on the second set of inputs. At block 310, a number of capacity sites can be determined based on the total traffic estimation and the site capacity. At block 312, a number of coverage sites can be determined bases on the total coverage estimation. At block 314, a number of cell sites for the sub-area (having an associated service area type) in the target service area can be determined. For example, in some embodiments, the number of cell sites for the sub-area in the target service area can be determined by selecting the maximum of the number of capacity sites 232 and the number of coverage sites 234 (i.e., the larger of the number of capacity sites 232 and the number of coverage sites 234 can be selected).

At block 316, if there is another sun-area (having an associated service area type) in the target service area, the process returns to block 304 and a number of cell sites for the next sub-area in the target service area can be determined by applying blocks 304-314. If there are no other sub-area (having an associated service area type) in the target service area, at block 318, a total number of cell sties for the target service area can be determined based on the determined number of cell sites for each sub-area in the target service area. For example, if the target service area is a city with two sub-areas each having a service area type (e.g., dense urban and urban), the total number of cell sites for the target service area can be determined by summing the number if cell sites for each sub-area (e.g., the dense urban sub-area and the urban sub-area). In another example, if the target service area includes only one sub-area (and one service area type), the total number of cell sites for the target service area would be equal to the number of cell sites determined for the single sub-area.

At block 320, a report may be generated indicating the total number of cell sites for the target service area. In some embodiments, the report may also include the total traffic estimation 228, number of capacity sites 232, total coverage estimation 230 and the number of coverage sites 234. In some embodiments, the report may include, for example, images, maps, text or metric based reports, audio reports, and the like. The report may be stored in memory or data storage of a computer system (e.g., memory 410 of computer system 400 shown in FIG. 4). In addition, the report may be provided to and displayed on a display (e.g., display 404 of computer 400 shown in FIG. 4). In some embodiments, the determined total number of cell sites can be provided to a user or to another software tool and utilized for additional processes for network planning such as, for example, determining the locations and parameters (or configurations) of the cell sites for the target service area. Parameters of each cell site can include, for example, antenna type, height, orientation, tilt, maximum power, device capacity, etc. Once the locations and parameters of the cell sites are determined, the cell sites may be deployed which can include, for example, obtaining leases for one or more of the cell site locations.

As mentioned above, various components of the system for dimensioning cell sites may be implemented on a computer system. FIG. 4 is a block diagram of an example computer system in accordance with an embodiment. The computer system 400 (e.g., a server) may include one or more processor devices 402, a display 404, one or more inputs 406, one or more communication systems 408, and memory 410. In some embodiments, processor device(s) 402 can be any suitable hardware processor or combination of processors, such as a central processing unit (CPU), a graphics processing unit (GPU), a microprocessor, an application specific integrated circuit (ASIC), field programmable gate arrays (FPGA), digital signal processors (DSPs), etc. The processor device(s) 402 may include one or more processors, processor cores, processing elements, processor clusters, or other electronic processing units. Accordingly, a processing function described as being performed by the processor device(s) 402 may include multiple processors, processor cores, processing elements, processing clusters, etc. (of the processor device(s) 402) performing aspects or portions (sub-functions) of the processing function to complete the processing function. The one or more electronic processing units of the processor device(s) 402 may include one or more microprocessors, application-specific integrated circuits ("ASICs"), or other suitable electronic device for processing data. At least in some examples, the one or more electronic processing units of the processor device(s) 402 can be co-located physically (e.g., in the same facility, building, room, rack, or computing housing) as part of the computer system 400.

In some embodiments, display 404 can include any suitable display devices, such as a computer monitor, a touchscreen, a television, etc. In some embodiments, display 404 can be omitted. In some embodiments, inputs 406 can include any suitable input devices and/or sensors that can be used to receive user input, such as a keyboard, a mouse, a touchscreen, a microphone, a graphical user interface (GUI), a voice user interface (VOI), mechanical switches, buttons, knobs, etc. and allow a user or operator to interact with the system for dimensioning cell sites. In some embodiments, inputs 406 can be omitted.

In some embodiments, communications system(s) 408 can include any suitable hardware, firmware, and/or software for communicating information over any suitable communication network (e.g., a 5G O-RAN communication network). For example, communication system(s) 408 can include one or more transceivers, one or more communication chips and/or chip sets, etc. In a more particular example, communication system(s) 408 can include hardware, firmware and/or software that can be used to establish a Wi-Fi connection, a Bluetooth connection, a cellular connection an Ethernet connection, etc.

In some embodiments, memory 410 can include any suitable storage device or devices (e.g., one or more non-transitory computer readable media) that can be used to store instructions, values, etc., that can be used, for example, by processor device 402 to present content using display 404, to communicate with a communication network, to communicate with other computer systems, etc. Memory 410 can include any suitable volatile memory, non-volatile memory, storage, or any suitable combination thereof. For example, memory 410 can include RAM, ROM, EEPROM, one or more flash drives, one or more hard disks, one or more solid state drives, one or more optical drives, etc. The memory 410 may store data and/or instructions for use and execution by the computer system 400 (e.g., by the processor device(s) 402) to implement the functionality of, for example, the capacity dimensioning tool 222, total traffic estimator module 224, total coverage estimator module 226, graphical user interface 500, etc. described herein. For example, the memory 410 may include or store the capacity dimensioning tool 222, total traffic estimator module 224, total coverage estimator module 226, and graphical user interface 500, shown in FIGS. 2 and 5, respectively. In some embodiments, the functionality described herein as being performed by the computer system 400 may be distributed among multiple computer systems, servers or devices (e.g., as part of a cloud service or cloud-computing environment).

Figure 5:
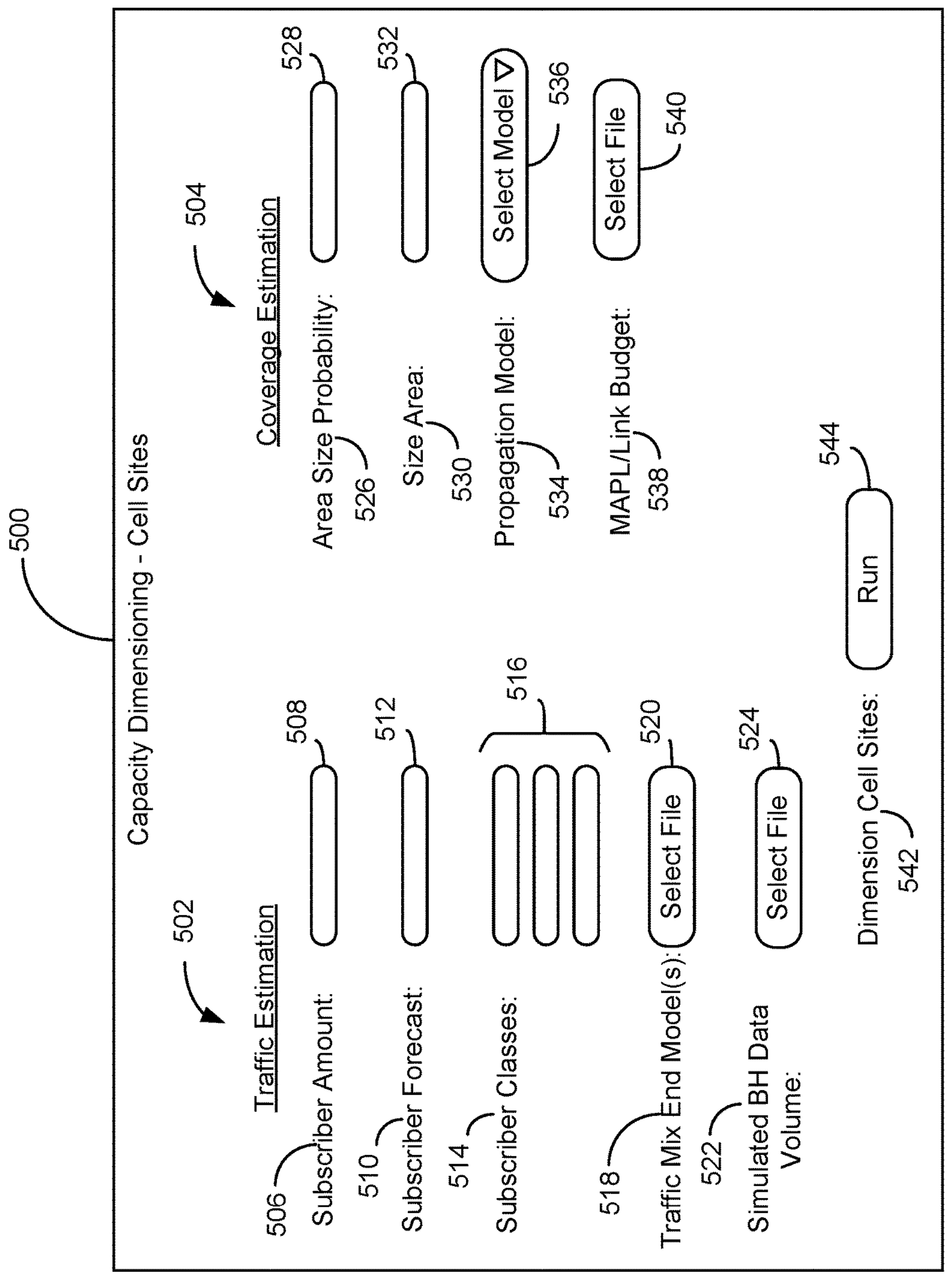
FIG. 5 illustrates an example graphical user interface for the system for capacity dimensioning of cell sites for a target service area in a wireless communication network of FIG. 2 in accordance with an embodiment.

As mentioned above, a graphical user interface (e.g., an input 406 shown in FIG. 4) may be provided to allow a user or operator to interact with the system for dimensioning cell sites to, for example, allow the inputs 202 (shown in FIG. 2) to be provided to or selected for the system for dimensioning cell sites and to initiate a determination of the number of cell sites for the target service area. FIG. 5 illustrates an example graphical user interface (GUI) 500 for the system for dimensioning cell sites for a target service area in a wireless communication network of FIG. 2 in accordance with an embodiment. The GUI 500 can include a number of inputs related to traffic estimation 502 (e.g., as performed by the total traffic estimator module 225 shown in FIG. 2) and a number of inputs related to coverage estimation (e.g., as performed by the total coverage estimator module 226 shown in FIG. 2). For traffic estimation, a data entry field 508 may be provided to receive a subscriber amount 506 and a data entry field 512 may be provided to receive a subscriber forecast 510. A plurality of data entry fields 516 may be provided to receive one or more subscriber classes 514 associated with the target service area and a corresponding service area type. An input element 520 can be provided that allows a user to select a file related to the traffic mix end models 518 information corresponding to the target service area and corresponding service area type. An input element 524 can be provided that allows a user to select a file related to the simulated BH data volume 522 corresponding to the target service area and corresponding service area type. In some embodiments, a data entry field may be provided for a user to enter the simulated BH data volume 522.

For coverage estimation, a data entry field 528 may be provided to receive an area size probability 526 and a data entry field 532 may be provided to receive a size area 530. An input element 536 can be provided that allows a user to select a propagation model 534 from, for example, a drop-down menu. In some embodiments, alternatively or in addition, a data entry field (not shown) may be provided to receive an identification of a propagation model 534 from the operator. An input element 540 can be provided that allows a user to select a file related to MAPL 538 information corresponding to the target service area and corresponding service area type. In some embodiments, the selected file related to the MAPL 538 may be a file for a link budget. Once the required input information is provided, an operator may initiate the capacity dimensioning process 542 by selecting an input element (e.g., a button) 544 to "Run" the process for dimensioning of the cell sites for the target service area. While FIG. 5 illustrates various components of a GUI 500, other embodiments of the GUI 500 can vary the arrangement and specific components of the GUI 500. In some embodiments, the GUI 500 can include fewer, additional, or different components in different configurations than illustrated in FIG. 5.

In some examples, aspects of the technology, including computerized implementations of methods according to the technology, can be implemented as a system, method, apparatus, or article of manufacture using standard programming or engineering techniques to produce software, firmware, hardware, or any combination thereof to control a processor device (e.g., a serial or parallel general purpose or specialized processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, for example, examples of the technology can be implemented as a set of instructions, tangibly embodies on a non-transitory computer-readable media, such that a processor device can implement the instructions based upon reading the instructions from the computer-readable media. Some examples of the technology can include (or utilize) a control device such as an automation device, a special purpose or general-purpose computer including various computer hardware, software, firmware, and so on. As specific examples, a control device can include a processor, a microcontroller, a field-programmable gate array, a programmable logic controller, logic gates, etc., and other types of components that are known in the art for implementation of appropriate functionality (e.g., memory, communication systems, power sources, user interfaces, and other inputs, etc.).

Certain operations of the methods according to the technology, or of systems executing those methods, can be represented schematically in the FIGs. or otherwise discussed herein. Unless otherwise specified or limited, representation in the FIGs. of particular operations in particular spatial order can not necessarily require those operations to be executed in a particular sequence corresponding to the particular spatial order. Correspondingly, certain operations represented in the FIGs., or otherwise disclosed herein, can be executed in different orders than are expressly illustrated, as appropriate for particular examples of the technology. Further, in some examples, certain operations can be executed in parallel, including by dedicated parallel processing devices, or separate computing devices configured to interoperate as part of a large system.

The present technology has been described in terms of one or more example embodiments, and it should be appreciated that many equivalents, alternatives, variations, and modifications, aside from those expressly stated, are possible and within the scope of the invention.

The invention claimed is:

1. A method for capacity dimensioning of cell sites for a target service area in a wireless communication network, the target service area having a set of sub-areas comprising one or more sub-areas, each sub-area associated with a service area type, the method comprising:

for each sub-area in the set of sub-areas:

receiving, with at least one processor device, a first set of inputs associated with the sub-area comprising a subscriber amount and forecast, one or more subscriber classes, a traffic mix end model, and a simulated busy hour data volume and a second set of inputs associated with the sub-area comprising an area size probability, a site area, a propagation model, and a maximum allowable path loss;

receiving, with the at least one processor device, a site capacity;

determining, with the at least one processor device, a total traffic estimation based on the first set of inputs;

determining, with the at least one processor device, a total coverage estimation based on the second set of inputs;

determining, with the at least one processor device, a number of capacity sites based on the total traffic estimation and the site capacity;

determining, with the at least one processor device, a number of coverage sites based on the total coverage estimation; and determining, with the at least one processor device, a number of cell sites for the sub-area in the target service area based on the number of capacity sites and the number of coverage sites;

generating, with the at least one processor device, a report comprising at least the number of cell sites for each sub-area in the target service area; and deploying one or more cell sites of the number of cell sites for each sub-area in the target service area.

2. The method according to claim 1, wherein the service area type is one of dense urban, suburban, urban, or rural.

3. The method according to claim 1, wherein determining a number of cell sites for the sub-area in the target service area comprises selecting the larger of the number of capacity sites and the number of coverage sites.

4. The method according to claim 1, further comprising determining a total number of cell sites for the sub-area by summing the determined number of cell sites for each sub-area in the target service area, wherein the generated report further comprises the total number of cell sites for the target service area.

5. The method according to claim 1, wherein the generated report further comprises one or more of the total traffic estimation, the total coverage estimation, the number of capacity sites, or the number of coverage sites.

6. The method according to claim 1, wherein the number of cell sites for the sub-area in the target service area is a number of cell sites per square kilometer.

7. The method according to claim 1, wherein the maximum allowable path loss is determined using a link budget.

8. A system for capacity dimensioning of cell sites for a target service area in a wireless communication network, the target service area having a set of sub-areas comprising one or more sub-areas, each sub-area associated with a service area type, the system comprising:

a memory that stores one or more computer readable media that include instructions; and one or more processor devices configured to execute the instructions of the computer readable media to:

for each sub-area in the set of sub-areas:

receive a first set of inputs associated with the sub-area comprising a subscriber amount and forecast, one or more subscriber classes, a traffic mix end model, and a simulated busy hour data volume and a second set of inputs associated with the sub-area comprising an area size probability, a site area, a propagation model, and a maximum allowable path loss;

receive a site capacity;

determine a total traffic estimation based on the first set of inputs;

determine a total coverage estimation based on the second set of inputs;

determine a number of capacity sites based on the total traffic estimation and the site capacity;

determine a number of coverage sites based on the total coverage estimation; and determine a number of cell sites for the sub-area in the target service area based on the number of capacity sites and the number of coverage sites;

generate a report comprising at least the number of cell sites for each sub-area in the target service area; and deploying one or more cell sites of the number of cell sites for each sub-area in the target service area.

9. The system according to claim 8, wherein the service area type is one of dense urban, suburban, urban, or rural.

10. The system according to claim 8, wherein the one or more processor devices are configured to execute instructions of the computer readable media further to: generate a graphical user interface configured to allow an indication of the first set of inputs, the second set of inputs and the site capacity.

11. The system according to claim 8, wherein determining a number of cell sites for the sub-area in the target service area comprises selecting the larger of the number of capacity sites and the number of coverage sites.

12. The system according to claim 8, wherein the one or more processor devices are configured to execute instructions of the computer readable media further to: determine a total number of cell sites for the target service area by summing the determined number of cell sites for each sub-area in the target service area, wherein the generated report further comprises the total number of cell sites for the target service area.

13. The system according to claim 12, wherein the total number of cell sites for the target service area is a number of cell sites per square kilometer.

14. The system according to claim 8, wherein the generated report further comprises one or more of the total traffic estimation, the total coverage estimation, the number of capacity sites, or the number of coverage sites.

15. A non-transitory, computer-readable medium storing instructions that, when executed by an electronic processor, perform a set of functions, the set of functions comprising:

for each sub-area associated with a target service area in a wireless communication network, each sub-area having an associated service area type:

receiving a first set of inputs associated with the sub-area comprising a subscriber amount and forecast, one or more subscriber classes, a traffic mix end model, and a simulated busy hour data volume and a second set of inputs associated with the sub-area comprising an area size probability, a site area, a propagation model, and a maximum allowable path loss;

receiving a site capacity;

determining a total traffic estimation based on the first set of inputs;

determining a total coverage estimation based on the second set of inputs;

determining a number of capacity sites based on the total traffic estimation and the site capacity;

determining a number of coverage sites based on the total coverage estimation; and determining a number of cell sites for the sub-area in the target service area based on the number of capacity sites and the number of coverage sites;

generating a report comprising at least the number of cell sites for each sub-area in the target service area; and deploying one or more cell sites of the number of cell sites for each sub-area in the target service area.

16. The non-transitory, computer-readable medium according to claim 15, wherein the service area type is one of dense urban, suburban, urban, or rural.

17. The non-transitory, computer-readable medium according to claim 15, wherein determining a number of cell sites for the sub-area in the target service area comprises selecting the larger of the number of capacity sites and the number of coverage sites.

18. The non-transitory, computer-readable medium according to claim 15, wherein the set of functions further comprises determining a total number of cell sites for the target service area by summing the determined number of cell sites for each sub-area in the target service area, wherein the generated report further comprises the total number of cell sites for the target service area.

19. The non-transitory, computer-readable medium according to claim 15, wherein the generated report further comprises one or more of the total traffic estimation, the total coverage estimation, the number of capacity sites, or the number of coverage sites.

20. The non-transitory, computer-readable medium according to claim 15, wherein the number of cell sites for the sub-area in the target service area is a number of cell sites per square kilometer.

* * * * *